April 14, 1942.  J. MIHALYI  2,279,477
PHOTOFLASH SYNCHRONIZING DEVICE
Filed Dec. 5, 1939
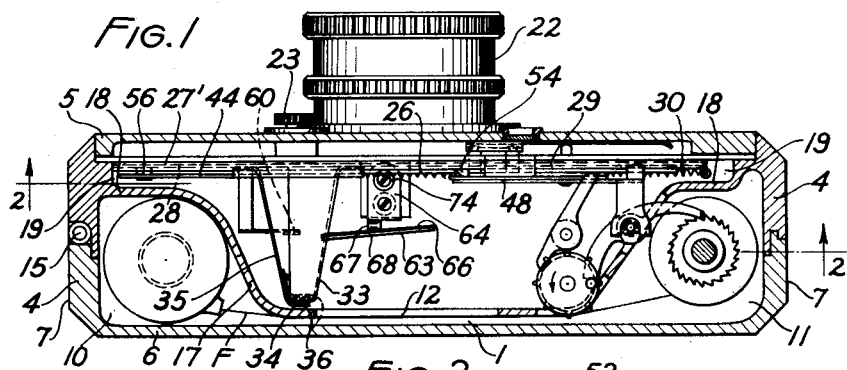
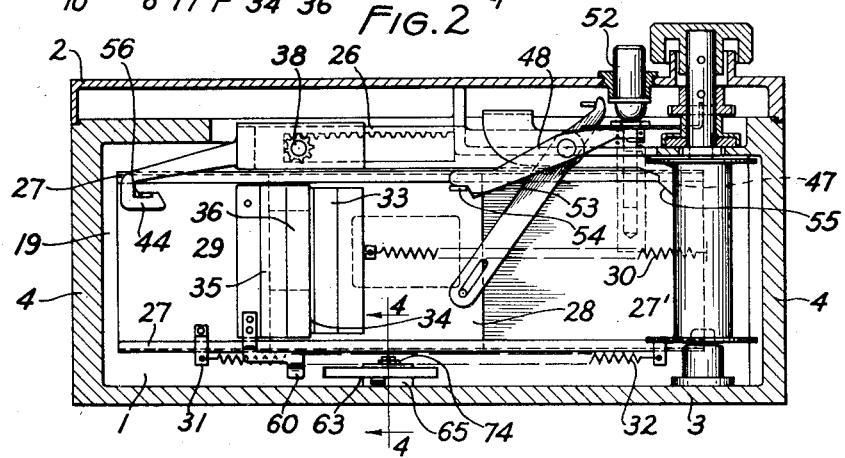
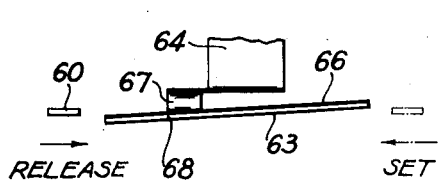
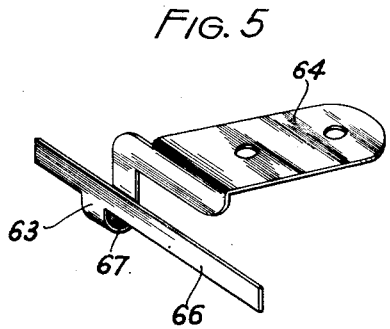
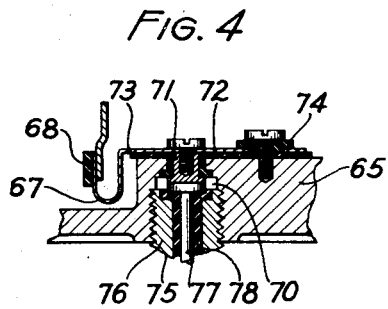
JOSEPH MIHALYI
INVENTOR
BY
ATTORNEYS Patented Apr. 14, 1942

2,279,477

UNITED STATES PATENT OFFICE 2,279,477

PHOTOFLASH SYNCHRONIZING DEVICE

Joseph Mihalyi, Rochester, N. Y., assignor to Eastman Kodak Company, Rochester, N. Y., a corporation of New Jersey Application December 5, 1939, Serial No. 307,643

4 Claims. (Cl. 67—29)

The present invention relates to photoflash synchronizers for use with photographic cameras, and particularly to a photoflash synchronizing device which is adapted for use with shutters of the setting type.

It has been found that the most accurate synchronization of the flashing of a photoflash lamp and the opening of a shutter is obtained if one of the switch contacts of the lamp circuit is carried by a movable part of the shutter mechanism, or a part moved in conjunction with the actuation of the shutter mechanism, said contact being adapted to engage the other switch contact which is stationary relative to the first contact to close the lamp circuit at the time the shutter is operated. It is common knowledge that all flash lamps have a "lag" period, as the time between the completion of the lamp circuit and the time the lamp reaches its maximum brilliancy is known, which must be accounted for in synchronizing the flash of a lamp with the operation of a shutter, and to account for this "lag" the switch contacts of the lamp circuit must remain in contact for a substantial length of time, as distinguished from an instantaneous make and break contact, and the contacts are usually adjusted so that they close the lamp circuit during the opening movement of the shutter whereby the lamp will be at its maximum brilliancy during the time the shutter is open. It will thus be readily understood that if one of the switch contacts of the lamp circuit is carried by, or moved in conjunction with, a movable part of the shutter operating mechanism relative to another contact which is stationary relative thereto, that the synchronization of the lamp and the operation of the shutter will be most easily adjusted for accurate operation.

This arrangement of the switch contacts of a lamp circuit is readily adapted to automatic shutters, or those which do not require setting. With setting type shutters, however, the problem of the lamp circuit being closed during the setting operation of the shutter provides an obstacle to the use of this type of synchronizing arrangement. With a setting type shutter any movable part in conjunction with which one of the shutter contacts might be moved ordinarily returns over the same path during the setting operation of the shutter that it takes during the release of the shutter so that the lamp circuit would be closed during the setting operation of the shutter. While there are known synchronizing devices which operate with such an arrangement they possess the disadvantage that the shutter must be set before a new lamp is placed in the circuit in place of the one previously burned, otherwise the lamp will be set off during the setting operation of the shutter with the result that the lamp is wasted and the subject, if unaware that a picture is being taken, is startled. Even though a photographer may be well aware of the fact that he must set the shutter before placing a new bulb in the lamp circuit, a synchronizing arrangement of this type results in a waste of many lamps and consequently the loss of extraordinary shots primarily due to the fact that the taking of flashlight pictures most frequently are taken under conditions requiring speed and thought on things other than camera operation on the part of the photographer.

Therefore, one object of the present invention is to provide a photoflash synchronizing device which is adapted for use in conjunction with shutters of the setting type. And another object is the provision of a synchronizing device of the type referred to wherein one switch contact is adapted to be carried by, or moved in conjunction with, a movable part of the shutter, or the operating mechanism therefor, and into engagement with a second contact mounted in the path of movement of said first contact and stationary relative thereto.

And yet another object is to provide a synchronizing device wherein the movable switch contact is adapted to engage the stationary contact with a wiping action, whereby the two contacts are adapted to be in engagement for a substantial duration of the time of movement of the shutter during its release.

A further object is the provision of a synchronizing device which is simple and is adapted to be built into the camera as an integral part thereof.

And yet another object is the provision of a synchronizing device of the type described in which the two switch contacts are electrically connected to separate terminals of a socket built into the body of the camera, which socket is adapted to receive an electrical plug connected to a power and lamp circuit in the form of a unit separate from the camera.

And another object is to provide a synchronizing device of the type described in which the stationary contact is adapted to be engaged by the movable contact during both the setting and release of the shutter, but in which the engagement of the two contacts during the setting operation of the shutter is adapted to be such that said contacts are not electrically connected so as to effect a closure of the lamp circuit.

And another object is the provision of a synchronizing device in which the alternate electrical engagement of the two switch contacts during the setting and release movements of the shutter is effected in the most simple manner, namely, by the location of one contact relative to the path of the other and the insulation of one portion of one of the contacts.

The novel features tahat I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawing in which, Fig. 1 is a longitudinal sectional view of a camera having a setting type shutter, and including a photoflash synchronizing device constructed in accordance with a preferred embodiment of my invention, Fig. 2 is a section taken substantially on line 2—2 of Fig. 1, Fig. 3 is a partial plan view of the two switch contacts of the synchronizing device, and showing the relation of the stationary contact relative to the path of movement of the movable contact, Fig. 4 is a section taken substantially on line 4—4 of Fig. 2, and showing the socket in the camera body into which a plug electrically connected to the power and lamp circuit is adapted to be inserted for electrically connecting the two contacts in the camera to opposite sides of said power circuit, and, Fig. 5 is an enlarged perspective of the stationary contact, and showing the construction and form thereof in detail.

Like reference characters refer to corresponding parts throughout the drawing.

Shutters of the setting type generally include movable mechanism, or parts of the same, which move in reciprocal paths during the release and setting operations of the shutter. To arrange one of the switch contacts of the flash circuit so as to move in accordance therewith to engage a second, or stationary, switch contact during the release movement of the shutter to complete the lamp circuit at such time as to insure the lamp being flashed at the time the shutter is opened, has been recognized as the most satisfactory and accurate manner of synchronizing the setting off of a flash lamp with the opening of a shutter, but with a shutter of the setting type, due to the fact that the movable parts of the shutter mechanism move in substantially a reciprocal path, the problem of avoiding completion of the lamp circuit during the setting operation of the shutter presents itself.

Briefly stated the present synchronizing device is designed so that one of the two switch contacts of the lamp circuit can be moved in conjunction with, or is directly carried by, a movable part of the shutter mechanism and is adapted to engage a stationary contact, to comply with the arrangement which is recognized as being the most satisfactory and accurate manner of arranging the contacts; and the two contacts are so arranged that the lamp circuit will not be completed when the movable switch contact is reciprocated over its path of movement during the setting operation of the shutter.

For the purpose of disclosing the present synchronizing device I have shown it in combination with a focal plane shutter of the type disclosed in my copending patent application Serial Number 247,423, filed December 23, 1938, now Patent No. 2,206,105, granted July 2, 1940, and to which application reference can be had for a complete description of the shutter itself which forms no part of the present invention except in so far as it cooperates with the synchronizing device hereinafter disclosed. While I have chosen to show my synchronizing device in combination with the particular shutter referred to, it is pointed out that the synchronizing device is not limited to use with this particular type of shutter, but could be used in connection with any shutter of the setting type.

The construction and operation of the particular shutter in combination with which the synchronizing device constituting the present invention has been shown will be outlined hereinafter only in so far as is necessary to an understanding of the operation of said synchronizing device, the shutter itself being completely disclosed in the above-noted copending patent application referred to.

Referring now to the drawing, the synchronizing device is shown in a camera which may have a more or less conventional exterior comprising a casing 1, having a top wall 2, a bottom wall 3, and end walls 4, all of which are preferably made of metal for the purpose which will be apparent from the following description. The front wall 5 extends substantially the entire length of a camera and the rear wall 6 corresponds in size and shape thereto. The rear wall 6, together with portions 7 of the end walls 4, may form a back which may be opened to load film into the camera.

It should be noticed that in this instance the camera back 6 may be swung open upon hinge 15 for threading film F into the camera. It should also be noticed that the exposure frame 12 is formed in a wall which is formed upwardly at 17 to form the film spool chambers 11 and 10, and this wall, as indicated at 18, is spaced away from the camera front 5 to form an opening or shutter chamber 19 which is substantially as long as the length of the camera. As indicated in Fig. 1, the front plate 5 carries an objective 22 and is provided with an adjusting knob 23 which may be turned to vary the speed of the shutter.

The shutter proper comprises a slideway mounted on a front 5 and which slideway includes pairs of spaced flanges 27 which may be carried by a base plate 27', this slideway supporting the two shutter plates 28 and 29. The plate 28 is the leading plate and plate 29 is the following plate, each one of these plates being normally moved toward the right of these figures by means of their respective springs, plate 28 being connected to the spring 30 and plate 29 being connected to a bracket 31 and a spring 32. Plate 28 is provided with a rearwardly formed member 33, the end of which, 34, is formed parallel to the exposure frame. Plate 29 is provided with a rearwardly formed plate 35 which has a pair of flanges 36 lying parallel to the film path. When the shutter plates move across the exposure frame with the flanges 36 and 34 spaced apart, the spacing between the two constitutes the slot, the width of which controls the exposure.

The following plate is held in its set position by a tripping latch 44 on the lever 26 normally adapted to engage the lug 56 on the plate 29, see Fig. 2, and the leading plate 28 is normally held in its set position by a latching member 53 on the tripping lever 48 engaging a lug 54 on said leading plate. To release the shutter, the trigger member 52 passing through the top wall 2 of a camera is depressed whereupon the latching member 53 may be swung from the path of the lug 54 carried by the shutter plate 28, releasing this member and enabling spring 30 to move it across the exposure aperture 12. As the shutter plate moves across, the lug 54 comes opposite a nose 47 on the lever 26 and when it strikes the cam surface 55 of this member, it rocks the lever 26 about its pivot 38, thereby lowering the tripping latch 44 so that this latch will release the lug 56 on the shutter plate 29 and permit its spring 32 to slide it through the slide way 27 and across the exposure frame. When the shutter is set the plates 29 and 28 are reciprocated back to the position shown in the drawing by a suitable mechanism, the description of which need not be set out in this application, but which may be found in my copending application above referred to. So far as the disclosure of the synchronizing device constituting the present invention is concerned it suffices to point out that the leading and following plates 28 and 29 and their respective flanges 36 and 34 respectively move reciprocally across the exposure aperture 12 and along the same path when moving to the release and set positions. It should, however, be pointed out that all parts of the shutter operating mechanism including the plates 29 and 28 are preferably made of metal.

Coming now to the present invention, my synchronizing device comprises a first contact 60 which is fastened directly to the plate 29 of the shutter operating mechanism by rivets or other suitable means to move therewith when said plate reciprocates between its release and set positions. This first contact is preferably L shaped in form and is adapted to extend rearwardly of the shutter chamber 19 adjacent the bottom wall 3 of the camera below the exposure aperture 12, see Fig. 2. The first contact is grounded to the casing which is metal since all of the shutter parts are of metal and grounded to each other, and is adapted to be connected to one line of a power circuit including a flash lamp as will be apparent from the following description.

Mounted on the bottom wall 3 of the camera casing and extending into the path of movement of the first contact 60 is a second contact 63 adapted to be electrically connected to the other side of the power circuit, not shown. This second contact preferably is of the form best shown in Fig. 5 and comprises an arm 64 which is adapted to be attached to an elevated portion 65 in the bottom wall 3 of the camera so that the elongated portion 66 thereof is adapted to extend at an angle to, and into, the path of movement of the first contact 60, see Fig. 3. The elongated portion 66 of the second contact 63 is connected to the arm 64 by an offset U portion 67 which is made of light gauge metal to permit the portion 66 to be easily moved laterally of its length when engaged by the first contact during its movement so that no appreciable resistance is offered to the movement of said first contact to impair the desired shutter speed.

Referring to Fig. 3, it will be noticed that due to the inclination of the second contact 63 relative to the path of movement of the first contact, when the first contact moves from its set position it is adapted to engage one side of the elongated portion 66 with a wiping action swinging the same as it moves the length thereof, and is adapted to engage the other side of said elongated portion 66 when moving from its released to its set position. To prevent the two contacts from being electrically connected during the setting operation of the shutter the side of the elongated portion 66 engaged by the first contact during the setting of the shutter is covered with an insulating material 68 whereby the contacts are insulated from one another during the setting of the shutter even though they engage in substantially the same manner as they do during the release of the shutter. Referring to Fig. 3 again it will be noticed that since opposite sides of the first contact 60 engage the elongated portion 66 in moving in the opposite direction, if desired one face of said first contact could be insulated from the other, and the insulation could be left off of portion 66 of the second contact and the desired results would be obtained.

The elongated portion 66 of the second contact is of such a length as to insure a wiping engagement between the two contacts over substantially the entire path of movement of the plate 29 during its release to insure a flashing of the lamp, and the second contact is so arranged relative to the first that the engagement of the two is initiated early enough to account for the "lag" in flash lamps so that the lamp will be at its full illumination when the shutter is opened and the engagement will be sufficiently long to insure a flashing of the lamp in the proper manner. The normal resiliency inherent in the U-shaped portion 67 is such as to return the elongated portion 66 of the contact to the position shown in Fig. 3, so that the first contact will engage it on the proper face regardless of which end of its path of movement the first contact is situated at. It will be obvious to anyone skilled in the art that the elongated portion 66 of the second contact could be mounted to the arm 64 in any suitable manner so that it would be capable of swinging transversely of the path of movement of the first contact. For instance, the elongated portion 66 could be pivoted to the arm 64 and normally moved to the inclined position by a spring.

The bottom wall 3 of the camera body is provided with an internally threaded socket 70 the top of which is provided with a terminal 71 insulated from the metal camera casing by the insulating insert 72. The second contact is electrically connected to the terminal 71 and insulated from the camera casing by the insulating strip 73 and the insulating insert 74. The socket 70 is adapted to receive an electrical plug 75 adapted to be connected to a power circuit including a flash lamp. Such a power circuit is not shown in the drawing but is known to those skilled in the art, and usually constitutes a portable battery case including a socket for the reception of a flash lamp, such socket being connected in the circuit of the battery carried by the case. The electrical plug 75 will be connected to the power circuit in such a way that one side of the circuit will be electrically connected to the threaded metal portion 76 of the plug 75 while the other side of the power circuit is adapted to be electrically connected to a post 77 extending through the bore of the metal portion 76 of the plug and insulated therefrom by a tube of insulating material 78. Thus it will be seen that when the plug 75 is screwed into the socket 70 in the camera one side of the power circuit is grounded through the metal camera casing to the first contact while the other side of the power circuit will be electrically connected through the terminal 71 to the second contact.

This synchronizing device is built into the camera in such a way as to become a part thereof. When flashlight pictures are not desired the plug 75 connected to the power circuit can be removed from the socket 70 and the camera can be used as any camera not having a synchronizing device built thereinto. The socket 70 may be of a size and threaded to become a threaded bore to receive a universal tripod screw found on well-known tripods. The second contact is made of such light-gauge metal and is so easily swung from its normal inclined position when contacted by the first contact as not to offer sufficient resistance to the normal movement of the plate 29 as to affect the given shutter speed, whereby the camera can be used for daylight photography with the same results as would be expected of a similar camera not having a synchronizing device in accordance with the present invention built thereinto.

It will be apparent from the above description that the present synchronizing device provides a very simple arrangement of parts which could be readily adapted to any shutter of the setting type. Such shutters whether they be of focal plane or between-the-lens types have a part of the shutter mechanism which moves reciprocally over substantially the same path during the release and setting movements of the shutter, and a contact corresponding to the first contact in the disclosed arrangement could be readily adapted to move with, or in conjunction with, such a part to engage a second, or stationary, contact to complete the lamp circuit substantially in the manner described. This synchronizing device due to its simplicity, and the arrangement of parts, can be added to any existing shutter mechanism readily and cheaply. There are no parts to wear out and no synchronizing adjustments to be made by the operator at the time of adapting the camera for flashlight pictures.

While I have shown and described one specific embodiment of my invention, I am fully aware that many modifications thereof are possible. My invention, therefore, is not to be restricted except in so far as is necessitated by the prior art and by the spirit of the appended claims.

Having thus described my invention what I claim is new and desire to secure by Letters Patent of the United States is:

1. In a photographic camera the combination with a shutter assembly of the setting type and including leaves movable in one direction when the shutter is released to make an exposure, and movable in the opposite direction when the shutter is set, of a photo-flash synchronizing arrangement comprising a first contact connected to one of said leaves to move therewith and adapted to be electrically connected to one side of a power circuit including a photo-flash lamp, a second contact adapted to be electrically connected to the other side of said power circuit and located in the path of movement of said first contact whereby it is adapted to be engaged by said first contact during the release movement of said leaves to close the circuit through said lamp, said second contact elongated and located relative to the path movement of said first contact whereby the engagement of the two is adapted to be a wiping action during a substantial part of the movement of said leaves, means for preventing said first contact from electrically contacting said second contact during a setting movement of said leaves, said means including insulating one face of said contact, and mounting said contact relative to the path of movement of said first contact so that the second contact engages said insulated face during the setting movement of the shutter.

2. In a photographic camera provided with an exposure aperture, the combination with a focal plane shutter including a leading blind and a following blind both adapted to move in spaced relation in one direction across said exposure aperture when released to make an exposure and adapted to move across said exposure aperture in the opposite direction when set, of a photo-flash synchronizing arrangement comprising a socket member in one wall of said camera one terminal of which is adapted to be electrically connected to one side of a power circuit including a photo flash lamp, and the other terminal of which is adapted to be electrically connected to the other side of said power circuit, a first two faced contact electrically connected to one of said terminals and operatively connected to one of said blinds to be reciprocally moved over a given path in conjunction therewith, a second two faced contact electrically connected to the other terminal and mounted in said camera at an inclination, and intermediate the extremities of, the path of movement of said first contact whereby it is adapted to be engaged on opposite faces by opposite faces of said first contact during a period of movement of said first contact in both directions with a wiping action, and means for insulating one face of one of said contacts whereby the contacts will not be electrically connected during their engagement incident to the setting of the shutter.

3. In a photographic camera provided with an exposure aperture, the combination with a focal plane shutter including a leading blind and a following blind both adapted to move in spaced relation in one direction across said exposure aperture when released to make an exposure and adapted to move across said exposure aperture in the opposite direction when set, of a photo-flash synchronizing arrangement comprising a socket member in one wall of said camera one terminal of which is adapted to be electrically connected to one side of a power circuit including a photo flash lamp, and the other terminal of which is adapted to be electrically connected to the other side of said power circuit, a first two faced contact electrically connected to one of said terminals and carried by the following blind to move reciprocally in a given path therewith, a second two faced contact electrically connected to the other terminal and mounted in said camera at an inclination to, and intermediate the extremities of, the path of movement of said first contact whereby it is adapted to be directly engaged on opposite faces by opposite faces of said first contact during movement of the same in both directions, and means for insulating the face of the second contact engaged by the first contact during the setting movement of the shutter, whereby the circuit will not be completed during a setting of the shutter.

4. In a photographic camera provided with an exposure aperture the combination with a focal plane shutter including a leading blind and a following blind both adapted to move in spaced relation in one direction across said exposure aperture when released to make an exposure and adapted to move across said exposure aperture in the opposite direction when set, of a photoflash synchronizing arrangment comprising a socket member in one wall of said camera one terminal of which is adapted to be electrically connected to one side of a power circuit including a photo flash lamp, and the other terminal of which is adapted to be electrically connected to the other side of said power circuit, a first contact electrically connected to one of said terminals and operatively connected to one of said blinds to be reciprocally moved over a given path in conjunction therewith, a second contact electrically connected to the other terminal of said socket, and means permitting said first contact to directly engage said second contact with a wiping action during the release movement of said following blind and preventing said first contact from directly engaging said second contact during the setting movement of said following blind, said last mentioned means including mounting said second contact at an angle to, and intermediate the extremities of, the path of movement of said first contact, whereby said first contact is adapted to engage one side of said second contact in moving in one direction, and a second side of said contact in moving in the other direction, insulating the second side of said second contact, and mounting said second contact in the camera whereby it is adapted to swing about its point of mounting in the camera transversely of the path of movement of said first contact when engaged thereby, and means normally moving said second contact into said position wherein it is inclined relative to the path of movement of said first contact.

JOSEPH MIHALYI.